Feb. 20, 1940.   R. J. KEHL   2,191,078
BLOWPIPE
Filed March 31, 1937   2 Sheets-Sheet 1
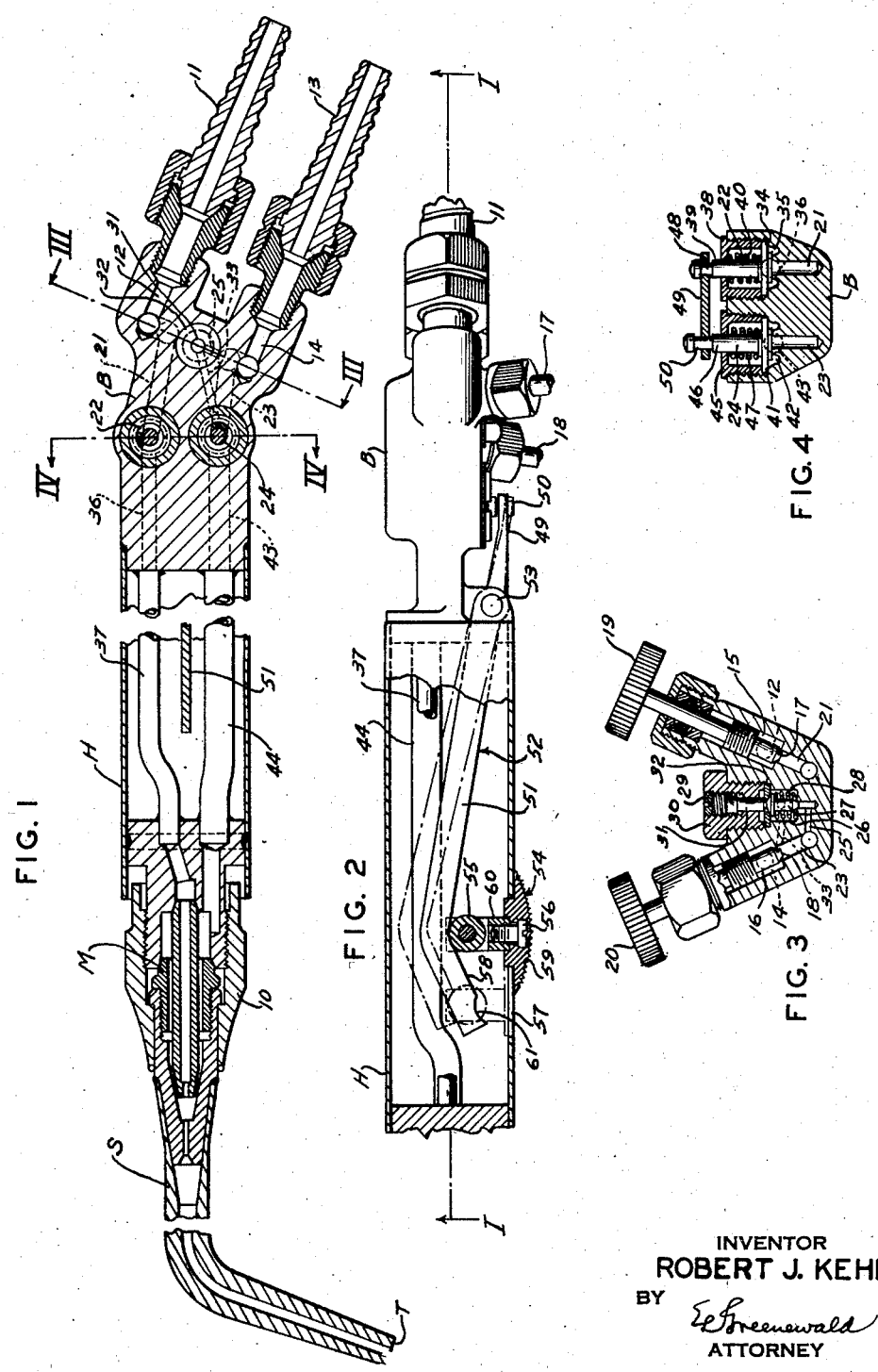
INVENTOR
ROBERT J. KEHL
BY
ATTORNEY Feb. 20, 1940.  R. J. KEHL  2,191,078
BLOWPIPE
Filed March 31, 1937   2 Sheets-Sheet 2
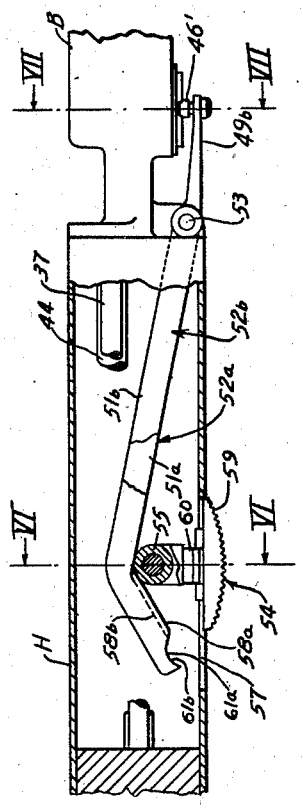
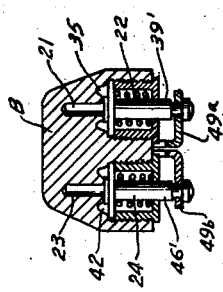
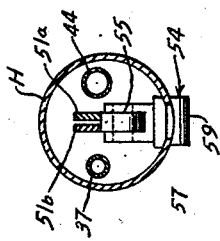
INVENTOR
ROBERT J. KEHL
BY
*Ed Greenewald*
ATTORNEY Patented Feb. 20, 1940

2,191,078

UNITED STATES PATENT OFFICE 2,191,078

BLOWPIPE

Robert J. Kehl, Manhasset, N. Y., assignor to The Linde Air Products Company, a corporation of Ohio Application March 31, 1937, Serial No. 133,950

17 Claims. (Cl. 158—27.4)

This invention relates to blowpipes such as those used for welding and cutting metals. After a welding blowpipe, for example, has been adjusted to deliver the correct welding flame, it is often desirable for the sake of economy to shut off the gases during intervals between successive welding operations. Welding blowpipes designed for this purpose are provided with a pair of main valves for independently adjusting the flow of the fuel gas, such as acetylene, and the flow of the combustion-supporting gas, such as oxygen, which valves are initially opened and set in the proper position to supply these gases to a mixing device which will deliver a correctly proportioned combustible mixture for the welding or heating flame. In addition, two auxiliary or shut-off valves, located between the main valves and the mixing device, are arranged to be opened at the will of the operator, as by manually depressing a lever, and are arranged to close automatically, as when the lever is released. Accordingly, the main valves when once adjusted, may be left untouched during an entire working day and the correct flame mixture may be delivered, as for a welding operation, by simply opening the auxiliary valves. Under certain circumstances, as when the blowpipe is provided with a small acetylene by-pass to provide a pilot light adjacent to the tip, it is desirable that the shut-off valves be operated successively, so that, for example, the acetylene to the blowpipe tip flows for a brief period after the oxygen has been shut off, or vice versa. By thus operating the shut-off valves in sequence, popping and the resultant clogging of the head and other passages with soot, as well as the hazard of the flame flashing back into the blowpipe, are effectively eliminated. Ordinarily it is desirable that the device employed for operating the shut-off valves be within easy reach of the operator's hand, and that it be capable of being controlled with a minimum degree of effort.

Accordingly, the principal objects of the present invention are: to provide an improved blowpipe having in addition to the main valves, a pair of auxiliary or shut-off valves for quickly shutting off and turning on the fuel gas and the combustion-supporting gas without changing the proportions of the gases forming the mixture; to provide improved means whereby the respective auxiliary valves may be operated sequentially to prevent popping and deposition of soot in the blowpipe passages; to provide improved lever mechanism for operating the auxiliary valves in predetermined sequence; to provide means for operating the lever mechanism conveniently and with minimum effort, and for maintaining the lever mechanism in the operated position; and to provide a blowpipe construction in which such lever mechanism and lever-operating means are compactly arranged and well protected. Other objects and the novel features will appear from the present specification and the accompanying drawings. In the drawings:

Fig. 1 is a central longitudinal sectional view, on the line I—I of Fig. 2, illustrating a blowpipe embodying this invention;

Fig. 2 is a view of a portion of the blowpipe of Fig. 1, being partially in plan and partially a central section perpendicular to that of Fig. 1;

Figs. 3 and 4 are cross sections, respectively, on the lines III—III and IV—IV of Fig. 1;

Fig. 5 is a view, partly in section, similar to Fig. 2, showing another embodiment of the invention;

Figs. 6 and 7 are cross sections, respectively, on the lines VI—VI and VII—VII of Fig. 5.

Referring to Figs. 1 to 4 inclusive, the blowpipe shown comprises an outlet stem S, and a valve body B, secured to the opposite ends of a tubular handle H. The usual gas mixer M is secured between the stem S and the handle H by a hollow nut 10 in well-known manner; and the stem S has a tip portion T which delivers the combustible mixture for the heating flame. The tip T also delivers a fuel gas for a pilot flame which continues to burn when the combustible mixture is shut off and ignites the heating flame when the delivery of said mixture is restored.

A nipple 11 supplies a combustion-supporting gas, such as oxygen, from a suitable supply hose to a bore 12 in the valve body B, while a nipple 13 supplies a fuel gas, such as acetylene, from a suitable supply hose to a bore 14 in the valve body B. The bores 12 and 14 terminate in an oxygen-valve chamber 15 and an acetylene-valve chamber 16 respectively. Main valves 17 and 18 are mounted in the respective chambers 15 and 16 and are operable by knurled heads 19 and 20 to control the supply of oxygen and acetylene to the blowpipe.

Auxiliary or shut-off valves 22 and 24 are located in the valve body B between the mixer M and the main valves 17 and 18. The auxiliary valves communicate with the exit side of the respective main valves through an oxygen duct 21 and an acetylene duct 23. A by-pass 25 leads from the acetylene duct 23 to a pilot-valve chamber 26; and a pilot valve 27, urged from its seat by a helical compression spring 28, is mounted within the chamber 26 to control the flow of acetylene for the pilot light. A flexible diaphragm 32 forms an hermetic seal with valve stem 31 and is held against an annular shoulder of the valve chamber 26 by a packing nut 30, threaded in the body B. The packing nut is axially bored to slidably receive the stem 31, the bore being threaded at its outer end to receive an adjustment screw 29 which engages the end of the stem 31 and regulates the position of the pilot valve 27.

A passage 33 in the valve body B connects the pilot valve chamber 26 with the outlet side of the acetylene shut-off valve chamber and bypasses thereto any acetylene entering the pilot-valve chamber 26. Thus, when the valve 18 is open, a small quantity of acetylene may be permitted to pass through the pilot-valve chamber 26 and thence through the passage 33 to the outlet side of the acetylene shut-off valve 24. This acetylene may then pass freely through the stem S to the outlet in the tip T of the blowpipe and there maintains a pilot light for lighting the blowpipe, the size of the pilot flame being regulated by the position of the pilot valve 27.

The auxiliary or shut-off valve means here shown comprises two spring-closed, mechanically-openable diaphragm valves, which normally are either fully open or fully closed. The oxygen shut-off valve 22 comprises a resilient diaphragm 34 which seats upon the end of the duct 21 and extends over an annular groove 35 encircling the end of the duct 21. An oxygen delivery tube or conduit 37 extends through the handle H to the mixer M, and communicates with the annular groove 35 through a bore 36 in the valve body B. A hollow nut 38, screwed into a threaded cavity in the valve body B, holds the diaphragm 34 tightly in place about its edges. The outer end of a stem 39 extends through the hollow nut, and while the flanged inner end is sealed in cooperative relationship with the diaphragm 34, a helical spring 40, compressed between the annular inner face of the hollow nut 38 and a flange at the inner end of the stem 39, normally holds the diaphragm tightly on its seat against the end of the duct 21.

Similarly, the acetylene shut-off valve 24 comprises a diaphragm 41 which seats upon the end of the acetylene duct 23 and extends over an annular groove 42 encircling the end of the duct 23. A fuel gas delivery tube or conduit 44 extends through the handle H to the mixer M and communicates with the groove 42 through a bore 43 in the body B. A hollow nut 45 is screwed into a second threaded cavity in the valve body B and holds the diaphragm 41 tightly in place about its edges. The outer end of a stem 46 extends through the hollow nut, while the flanged inner end is sealed in cooperative relationship with the diaphragm 41. A helical spring 47 normally holds the diaphragm 41 tightly against its seat. Thus, the valves 22 and 24 remain closed by spring action until pressure against the stems 39 and 46 lifts the diaphragms from their seats and allows the gases to flow through the respective valves. The valve stems 39 and 46 are provided near their outer ends with necks 48 and 50, respectively, to form operating surfaces on the stems for cooperation with suitable valve operating means described hereinafter, and the neck 50 preferably is longer than the neck 48.

In the embodiment of the invention illustrated in Figs. 1 to 4, inclusive, an actuating mechanism including lever means 52 is employed to open both auxiliary valves 22 and 24 against the action of their respective springs. The lever 52 is pivoted immediate its ends and on the valve body B, as at 53, so that substantially all of its longer portion or arm 51 is positioned within and is fully protected by the tubular handle H, the pivot 53 being located preferably adjacent to and within the outline of the rear end of the handle. The shorter portion or arm 49 of the lever 52 has operating portions such as notches embracing the necks 48 and 50 and lifts the stems 39 and 46 when the lever is pressed inwardly. Since the neck 50 is longer than the neck 48, as illustrated in Fig. 4, the valves operate sequentially in response to the rocking movement of the lever 52, the acetylene valve 24 opening after, and closing before, the oxygen valve 22. The delayed closing of the oxygen valve results in expelling the residual gas mixture from the stem and mixer, thereby eliminating popping and resulting clogging of gas passages with soot. Similarly, by interchanging the stems 39 and 46, a delayed closing of the acetylene valve 24 will expel the residual gas mixture and prevent popping and soot deposition. Instead of making the necks 48 and 50 of unequal length, the proper timing of the valves may also be accomplished by making the necks of equal length and providing different thicknesses of metal for the portions of the lever adjoining the two slots which receive the necks of the valve stems.

The longer arm 51 of the lever 52 extends between and lengthwise of the tubes 37 and 44, and is provided with an outwardly bent portion at its forward free end to form an operating or cam surface 58 with which a manually operable actuating device, such as a slide 54, may cooperate. The reciprocable slide 54 is movable along a longitudinal slot 57 in the handle H and is operable to depress the arm 51, preferably by frictional or rolling engagement with the cam surface 58. As shown in Figs. 2, 5, and 6, the slide 54 comprises a thumb piece or plate 59 and a forked roller carrier 60, bearing respectively against the outer and inner surfaces of the handle H, the two parts being secured together by a screw 56. A roller 55 is rotatably mounted within the forked end of the carrier 60 in position to engage and travel along the cam surface 58. Forward movement of the slide 54 causes the roller to depress the arm 51 of the lever 52 to the position shown in broken lines in Fig. 2, rocking the lever and opening the auxiliary valves 22 and 24. The cam surface of the arm 51 has a curved portion such as a depression 61 adjacent its end, adapted to interfit with the roller 55 and into which part the roller 55 passes upon completing its forward movement, so that the slide 54 will be releasably held or latched in its forward position during the time that the auxiliary valves are open, and so that no effort on the part of the workman is necessary to resist the action of springs 40 and 47 while the blowpipe is in use. A slight rearward pressure by the thumb against the plate 59, releases the roller from the depression; whereupon the valve springs 40 and 47 automatically close the valves 22 and 24 in the desired sequence and force the arm 51 outward and the slide 54 backward to the position indicated in full lines in Fig. 2.

In some blowpipes having a single lever for controlling the shut-off valves, popping may occur when these valves are closed, because the pressure of the gas mixture diminishes to a point at which the flame can travel backward into the blowpipe. By providing a time interval between the closing of the two valves, e. g., so that the acetylene will be shut off first and the oxygen at an appreciable time later, the residual combustible mixture will be expelled from the blowpipe by the final oxygen pressure and no popping or deposition of soot will occur. This condition is especially desirable when the blowpipe is to be lighted electrically or by other external igniting means.

On the other hand, if the blowpipe is equipped with an acetylene or other fuel gas pilot flame, there should be a reverse closing of the shut-off valves with a corresponding intervening period of time. In this case the oxygen should be shut off first, then the residual oxygen will be driven out by the final acetylene pressure, so that popping will not occur and the pilot flame will continue to burn after the main flame dies out.

Another blowpipe embodying the principles set forth in the preceding paragraph is shown in Figs. 5, 6 and 7, in which a single slide actuates two independent valve-operating levers having cam surfaces so arranged as to provide the desired timing that this operation requires. Here, two levers 52a and 52b, individual to the two shut-off valves, are independently pivoted as at 53 and are provided with short arms 49a, 49b and long arms 51a and 51b, respectively. The levers are similar, except that cam surface 58a desirably is offset with respect to cam surface 58b. By constructing arm 51a so that during the valve-opening movement the cam surface 58a is contacted by the roller 55 prior to the surface 58b, the arm 51a may be depressed ahead of arm 51b to obtain sequential operation of the valves without making the necked portions of valve stems 39' and 46' of different lengths. The motions imparted to these valves, and the timing sequence, are controlled by proper design of the contours of cam surfaces 58a, 58b at the forward ends of the levers 52a and 52b. Depressions 61a and 61b may be provided to releasably latch the levers and the slide after the valves have been opened.

From the foregoing, it will be apparent that a construction is provided wherein all of the valves are located outside of the blowpipe handle; namely, in the valve body B which is secured in but separable from the rear end of the tubular handle H. The means for operating the auxiliary valves are well protected. The long arms of the levers extend from their pivots on the valve body directly into the open rear end of the handle, and no parts extend appreciably outside the outline of the blowpipe handle. Such parts, therefore, are not likely to be caught on clothing or other objects external to the blowpipe. Furthermore, the timing of the closing of the shut-off valves insures that the residual gas mixture will be expelled from the blowpipe passages, which eliminates popping and clogging deposits of soot in such passages.

What is claimed is:

1. A blowpipe comprising, in combination, a tubular handle; a gas conduit within said handle; a valve controlling the flow of gas through said conduit; means for actuating said valve comprising a lever pivoted intermediate its ends at a point located outside said handle and within the projected tubular outline of said handle, the arms of said lever being of unequal length, the shorter arm of said lever being operatively associated with said valve and the longer arm extending into said handle; and a device slidably engaging said blowpipe and the longer arm of said lever for actuating said lever to operate said valve.

2. A blowpipe comprising, in combination, a tubular handle; spaced gas conduits within said handle; valves severally controlling the flow of gases through said conduits; means for operating said valves comprising a lever pivoted intermediate its ends, the arms of said lever being of unequal length, the longer arm extending into the space between said conduits within said handle and the shorter arm of said lever operatively engaging said valves; and a device slidably engaging said blowpipe and the longer arm of said lever for actuating said lever to operate said valves.

3. A blowpipe comprising, in combination, a tubular handle; a gas conduit within said handle; a valve controlling the flow of gas through said conduit; and means for actuating said valve comprising a lever pivoted intermediate its ends, the arms of said lever being of unequal length, the shorter arm of said lever operatively engaging said valve and the longer arm extending into said handle and having a cam portion, and a manually operable device movably mounted on said blowpipe and engaging the cam portion of said lever to rock said lever to operate said valve.

4. A blowpipe as claimed in claim 3, in which said lever has a portion adjacent one end of said cam portion adapted to interfit with said device to releasably latch said lever and hold said valve in open position.

5. A blowpipe as claimed in claim 3, in which said lever has a depression adjacent one end of said cam portion, and said device comprises a roller adapted to engage in said depression and releasably latch said lever so as to hold said valve in open position.

6. A blowpipe comprising, in combination, a tubular handle; two gas conduits within said handle; two valves severally controlling the flow of gases through said conduits; two levers severally adapted to open said valves, each lever being pivoted intermediate its ends so as to provide arms of unequal length, the longer arms of said levers extending into said handle and the shorter arms of said levers each being operatively associated with one of said valves; and a manually operable device adapted to engage and travel along portions of such longer arms to rock said levers to actuate said valves.

7. A blowpipe as claimed in claim 6, in which the portion of one lever engaged by said manually operable device is formed with a different contour from the corresponding portion of the other lever so that said levers are rockable in sequence by said manually operable device to open said valves in sequence, and said levers and manually operable device have interfitting portions adapted to releasably latch said levers so as to retain said valves in open position.

8. A blowpipe comprising, in combination, a tubular handle; a gas conduit within said handle; a valve controlling the flow of gas through said conduit; and means for actuating said valve comprising: a pivoted lever having a portion outside said handle operatively associated with said valve and having a portion within said handle provided with a cam surface, and a device slidable along said handle and adapted to engage said cam surface and rock said lever to actuate said valve.

9. A blowpipe as claimed in claim 8, in which said lever and said device have interfitting parts adapted to latch said valve in open position.

10. A blowpipe as claimed in claim 8, in which said device includes a roller adapted to engage and roll along said cam surface.

11. A blowpipe as claimed in claim 8, in which said device includes a thumb piece slidable along the outside of said handle.

12. A blowpipe comprising, in combination, a tubular handle; spaced fuel gas and combustion-supporting gas conduits within said handle; two valves severally controlling the flow of gases to said conduit, said valves each having a stem provided with an operating surface thereon; a single lever pivoted to said blowpipe intermediate its ends, and having arms of unequal length with the longer arm thereof extending into said handle and the shorter arm thereof being disposed within the projected outline of said handle and continuously engageable with said valve stems, said shorter arm having operating portions spaced respectively at different distances from said operating surfaces, whereby said valves may be opened sequentially, and, during release of said lever means, one of said valves may close first and the closing of the other valve be delayed for a sufficient time to permit the gas still flowing to expel any residual combustible gas mixture from the blowpipe; and a device engaging the longer arm of said lever for actuating said valves.

13. A blowpipe comprising, in combination, a tubular handle; a valve block secured to the rear end of said handle; a gas outlet tip secured to the front end of said handle; a gas mixer adjacent the front end of said handle and adapted to supply a combustible gas mixture to said tip; independent conduits within said handle for separately supplying a fuel gas and a comblustion-supporting gas from said valve block to said mixer; two valves carried by said valve block outside said handle and severally controlling the flow of the two gases through said conduits to said mixer; and mechanism operable to close said valves in such sequence as to first close one of said valves and to delay the closing of the other vlave for a sufficient time to permit gas still flowing to expel residual combustible mixture from the blowpipe and thereby eliminate popping and resultant deposition of soot within the blowpipe passages, said mechanism including lever means pivoted intermediate the ends thereof on said block and having a portion thereof extending into the rear end of said handle and another portion thereof operatively associated with said valves, and a device mounted on said handle and engaging the portion of said lever means extending thereinto to actuate said lever means to operate said valves.

14. A blowpipe comprising, in combination, a gas outlet tip; a gas mixer adapted to supply a combustible gas mixture to said tip; independent conduits for separately supplying a fuel gas and a combustion-supporting gas to said mixer; two valves severally controlling the flow of the two gases through said conduits to said mixer; and mechanism adapted to open and close said valves in a pre-selected sequence, said mechanism comprising a lever pivoted intermediate its ends to said blowpipe, one end of said lever operatively engaging said valves, and a device movable longitudinally along said blowpipe and operatively engaging the opposite end of said lever to actuate the same to open and close said valves.

15. A blowpipe comprising, in combination, a tubular handle; two gas conduits within said handle; valves severally controlling the flow of gases through said conduits; and means for actuating said valves, said means comprising two levers each having one end thereof operatively associated with one of said valves, and a single operating device movably mounted on said blowpipe and engaging the opposite ends of both levers to actuate the same to operate said valves.

16. A blowpipe comprising, in combination, a tubular handle; two gas conduits within said handle; valves severally controlling the flow of gases through said conduits; and means for actuating said valves, said means comprising two levers each operatively associated with one of said valves and having arms extending into said handle, each arm having a cam surface, and a device slidable along said handle and adapted to engage said cam surfaces and to actuate said levers in sequence.

17. A blowpipe comprising, in combination, a tubular handle having a well provided with a longitudinal slot; gas conduit means within said handle; valve means controlling the flow of gas through said conduit means; and means for operating said valve means, such operating means including a thumb-piece slidably engaging the exterior of said wall and projecting into said slot, a roller carried by said thumb-piece and disposed within said handle, and lever means pivoted intermediate the ends thereof, said roller being adapted to engage said lever means adjacent one end of the latter and said valve means being engageable by said lever means adjacent the other end of the latter whereby movement of said thumb-piece will move said lever means to actuate said valve means.

ROBERT J. KEHL.